(12) United States Patent
Cartwright

(10) Patent No.: US 9,181,110 B2
(45) Date of Patent: Nov. 10, 2015

(54) WATER SOFTENER USING NANOFILTRATION TO RECLAIM A PORTION OF THE REGENERATING SOLUTION

(71) Applicant: Peter S. Cartwright, Bloomington, MN (US)

(72) Inventor: Peter S. Cartwright, Bloomington, MN (US)

(*) Notice: Subject to any disclaimer, the term of this patent is extended or adjusted under 35 U.S.C. 154(b) by 102 days.

(21) Appl. No.: 14/076,900

(22) Filed: Nov. 11, 2013

(65) Prior Publication Data

US 2014/0069852 A1    Mar. 13, 2014

Related U.S. Application Data

(63) Continuation-in-part of application No. 12/842,644, filed on Jul. 23, 2010, now Pat. No. 8,580,118, which is a continuation of application No. 10/587,955, filed as application No. PCT/US2005/002537 on Jan. 28, 2005, now abandoned.

(60) Provisional application No. 60/540,396, filed on Jan. 30, 2004.

(51) Int. Cl.

| | |
|---|---|
| *B01D 61/08* | (2006.01) |
| *B01D 61/12* | (2006.01) |
| *C02F 5/00* | (2006.01) |
| *C02F 1/42* | (2006.01) |
| *B01D 65/02* | (2006.01) |
| *C02F 1/16* | (2006.01) |

(Continued)

(52) U.S. Cl.
CPC .............. *C02F 1/442* (2013.01); *B01D 61/08* (2013.01); *C02F 1/42* (2013.01); *B01D 61/12* (2013.01); *B01D 2311/268* (2013.01); *C02F 1/16* (2013.01); *C02F 2209/005* (2013.01); *C02F 2209/055* (2013.01); *C02F 2209/44* (2013.01); *C02F 2303/16* (2013.01)

(58) Field of Classification Search
CPC ........ B01D 15/36; B01D 15/20; B01D 24/46; B01D 24/02; B01D 24/48; B01D 61/02; B01D 61/027; B01D 61/04; B01D 61/12; B01D 61/10; B01D 61/08; B01D 61/58; B01D 2311/268; B01D 2311/02; B01D 2311/04; B01D 2311/22; B01D 2311/24; B01D 2311/243; B01D 2311/246; B01D 2311/25; B01D 2313/083; B01D 2313/08; B01D 2313/10; B01D 2313/105; B01D 2313/12; B01D 2313/125; B01D 2313/243; B01D 2313/40; B01D 2313/48; B01D 2313/90; B01D 2315/20; C02F 1/44; C02F 1/442; C02F 1/28; C02F 1/58; C02F 1/42; C02F 5/00
See application file for complete search history.

(56) References Cited

U.S. PATENT DOCUMENTS

| | | |
|---|---|---|
| 3,216,450 A | 11/1965 | Timmons |
| 4,275,448 A | 6/1981 | Le Dall |

(Continued)

*Primary Examiner* — Katherine Zalasky
(74) *Attorney, Agent, or Firm* — Charles Sara

(57) ABSTRACT

A water softening system includes apparatus that recycles a substantial percentage of the solution used for regenerating the system. This system conventionally includes a brine tank and a softening tank through which hard water from a source passes during normal operation. During a regeneration mode, the solution of sodium or potassium ions in the brine tank passes through the softening tank acquiring hardness ions, and then through a nanofilter that passes a much higher proportion of the sodium or potassium ions than the hardness ions from a high pressure side to a low pressure side. The hardness ions flow from the upstream end of the nanofilter through an outlet and into a drain. The liquid passing through the nanofilter contains salt that returns to the brine tank for reuse. Concentration of sodium or potassium ions may be tested during a fast rinse portion of the regeneration cycle.

8 Claims, 1 Drawing Sheet

(51) Int. Cl.
  *C02F 1/58* (2006.01)
  *C02F 1/44* (2006.01)

(56) References Cited

U.S. PATENT DOCUMENTS

| | | |
|---|---|---|
| 4,321,137 A | 3/1982 | Kohler |
| 4,387,026 A | 6/1983 | Woolacott |
| 5,254,257 A | 10/1993 | Brigano et al. |
| 5,352,362 A * | 10/1994 | Mizutani et al. ............. 210/650 |
| 5,908,549 A * | 6/1999 | Wigen ......................... 210/126 |
| 6,004,464 A | 12/1999 | Lien |
| 6,106,722 A | 8/2000 | Chew et al. |
| 6,666,971 B2 | 12/2003 | Chen |
| 7,132,052 B2 | 11/2006 | Rawson et al. |
| 2003/0052060 A1 | 3/2003 | Teel, Jr. |

\* cited by examiner

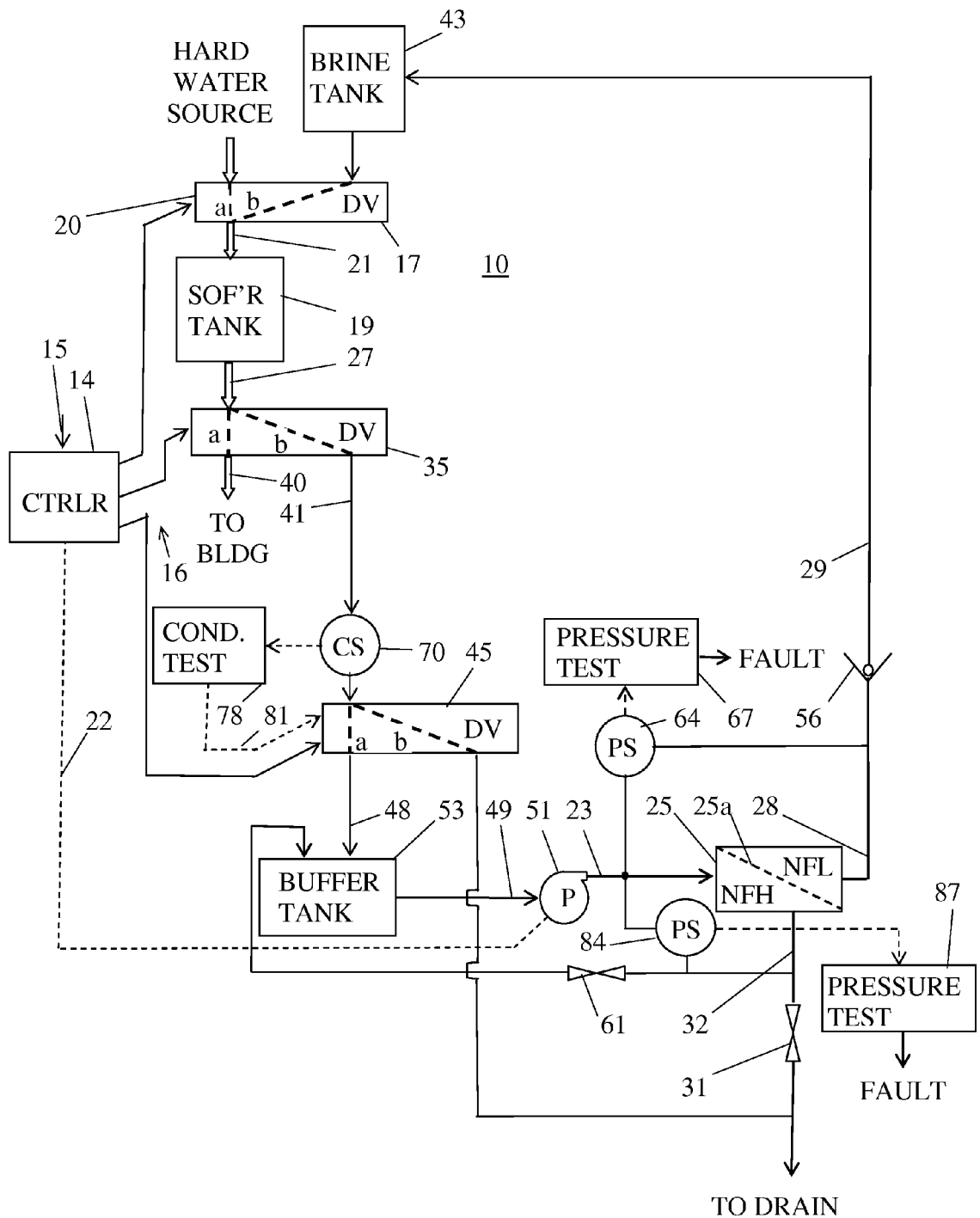

WATER SOFTENER USING NANOFILTRATION TO RECLAIM A PORTION OF THE REGENERATING SOLUTION

CROSS-REFERENCE TO RELATED APPLICATIONS

This is a continuation-in-part application filed under 37 CFR §53(b) claiming priority under 35 U.S.C. §120 of copending U.S. patent application Ser. No. 12/842,644 filed Jul. 23, 2010, which claims priority from U.S. patent application Ser. No. 10/587,955 having a 371(c) filing date of Jul. 31, 2006 which is a U.S. national election consistent with 35 U.S.C. §363 of international patent application Ser. No. PCT/US05/02537 filed Jan. 28, 2005 claiming priority under 35 U.S.C. §119(e) (1), of provisional application Ser. No. 60/540,396, having a filing date of Jan. 30, 2004, each of which is incorporated herein by reference in their entireties.

FIELD OF THE INVENTION

The present invention relates to water softening systems. In particular, the present invention relates to a water softening system having a filtration system that separates hardness ions from a softening solution so that the softening solution can be reused instead of being discharged with the hardness ions into a drain.

BACKGROUND OF THE INVENTION

Among industrialized nations of the world, there is a growing concern for, and emphasis on, environmentally responsible practices. For example, more and more governments and communities are interested in minimizing the kinds and quantities of chemicals that are deposited into water systems, including wastewater systems. A common form of wastewater pollution is the alkali metals such as sodium and potassium discharged into sewers or septic systems during typical regeneration processes of water softeners.

For the last fifty years or so, water softening has become widely used in those regions where water supplies contain high concentrations of calcium and magnesium, and are therefore considered "hard". Utilizing a sodium or potassium ion exchange process, resin-based water softeners are installed on water lines, particularly those leading into residences, to soften most if not all of the water used inside such homes. As a water supply passes through ion exchange resins inside a water softener, the calcium and magnesium ions bond to the resins and are removed from the water flow.

Periodically, these ion exchange resins must be regenerated by removing the hardness ions on the resins. Typically this regeneration is accomplished utilizing by washing the resins with an aqueous solution of alkali metal salts such as sodium or potassium chloride. The term "regenerant" in this application means "a liquid suitable for causing sodium or potassium to replace hardness ions on the surface of the softening resin."

In a typical regeneration process, the regenerant is slowly pumped through the resin bed. Through a chemical exchange process, the calcium and magnesium ions which were adsorbed onto the resin during the softening process are stripped off the resins and replaced with sodium or potassium ions. At the conclusion of this process, the "spent" solution containing both the hardness ions and the regenerant is discharged into the sewer or septic system. It is this discharge that has serious long-term effects on the environment, as the regenerant salinity, total dissolved solids, and/or chloride cause corrosion in the sewage system, and contaminate the planet's fresh water supplies.

Presently, because this pollution problem has defied resolution by economically acceptable means, some communities are resorting to banning or limiting water softening in homes. For example, on Oct. 12, 2009, California governor Arnold Schwarzenegger signed into law, a bill giving local California water agencies the authority to restrict or even to ban the use of water softeners using on-site salt-based regeneration.

Scientific studies such as one conducted by Santa Clarita, Calif. are finding that regenerant discharged from water softeners is a significant source of water pollution. This finding supports prohibitions of, or restrictions on, current commercially available water softening systems. Consequently, removing the alkali salts from the spent regenerant before the solution is discharged has become an immediate and real concern both for communities that want soft water and for water softener manufacturers.

SUMMARY OF THE INVENTION

The present invention relates to an improved water softener system comprising apparatus by which the apparatus operates to separate hardness ions from regenerant in a way to allow most of the regenerant to be reclaimed, thereby reducing the discharge of regenerant into the environment.

Nanofiltration (NF) is a pressure driven, membrane separation technology that separates ionic solute from water supplies based on the ionic charge of the solute. Preferred embodiments of the present invention include a pump that supplies the force required to effect the separation and the feeding of a regenerant or feed stream into a housing containing a nanofilter membrane element.

In the NF process, multivalent salts are rejected to a higher degree than monovalent salts. Thus, NF used as part of a water softener system can be used to selectively remove the multivalent hardness ions from a regenerant and direct them to a drain while monovalent salts that make up the regenerant are recycled to a water softener brine tank. With the present invention, approximately 90% or more of the regenerant that typically is discharged into a drain can be recovered and recycled, thereby minimizing water pollution as well as the cost of water softener salt from which regenerant is prepared.

The softener system of the invention has normal and regeneration modes. During normal mode, hardness ions exchange positions with salt ions held onto the resin particles. When most of the salts on the resin particles have been replaced with hardness ions, the softener system goes into regeneration mode.

The invention's regeneration mode has two phases of operation that are modifications of the current industry standard. These modifications substantially reduce the amount of salt discharged into the drain during regeneration.

The apparatus regenerates a water softening system that removes multivalent ions from water provided by a hard water source, and recovers at least a portion of the regenerating salt used for the regeneration. Such a water softening system conventionally includes a softener tank through which the water from the source passes from an upstream end thereof to a downstream end thereof, and a brine tank for holding a regenerant comprising monovalent ions.

A first diverter valve supplies liquid selectively from either the water source or the brine tank to the upstream end of the softener tank depending on the system's current mode. For improved regeneration, the system includes a nanofilter having upstream and downstream sides. The upstream side of the nanofilter has an inlet and an outlet, and the downstream side has an outlet. The nanofilter passes monovalent ions to the downstream side and retains multivalent ions on the upstream side;

A second diverter valve is connected to receive liquid from the downstream end of the softener tank and to selectively supply liquid at a first outlet to a water distribution system and to a second outlet. There is a connection between the downstream side outlet of the nanofilter and the brine tank. A first throttling valve is installed on the upstream side outlet of the nanofilter.

A pump receives liquid from the second outlet of the second diverter valve and supplies pressurized liquid to the upstream side inlet of the nanofilter. A third diverter valve has an inlet and first and second selectable outlets. The third diverter valve inlet is connected to receive liquid from the second outlet of the second diverter valve. The first outlet of the third diverter valve is connected to the pump, and the second outlet of the third diverter valve connected to another destination.

A controller in response to a regeneration signal enters the system into a regeneration mode. During a first phase of the regeneration mode the controller:
a) operates the first diverter valve to pass regenerant from the brine tank through the softener tank of the water softening system;
b) operates the second diverter valve to direct liquid from the downstream end of the softener tank to the second outlet of the second diverter valve; and
c) operates the third diverter valve to supply liquid from the second outlet of the second diverter valve to the first outlet of the third diverter valve.

During a second phase of the regeneration cycle which follows the first phase of the regeneration cycle, the controller operates the third diverter valve to direct liquid from the second diverter valve to the second outlet of the third diverter valve.

The apparatus further includes a buffer tank interposed between the third diverter valve's first outlet and the pump, and the controller operates the second and third diverter valves to direct liquid from the downstream end of the softener tank to the buffer tank during the regeneration cycle.

The first throttling valve in one preferred embodiment of the apparatus has a pressure drop that causes from 5-25% of the flow to the nanofilter's upstream side inlet to divert through the upstream outlet to the drain.

Another version of the softening system also comprises a pipe between the third diverter valve's second output and the drain. During the second, fast rinse phase of the regeneration mode, liquid having almost no hardness ions and little alkali metal ion concentration may be directed to the drain with little harm. The controller accomplishes this by causing the third diverter valve to connect the inlet thereof to the second outlet during the second phase of the regeneration mode.

The apparatus may further include an alkali metal ion concentration (salinity) detector receiving liquid from the second diverter valve's second outlet. The alkali metal ion concentration (salinity) detector provides a signal indicating the salinity of the received liquid. Upon detecting the salinity of said liquid to be below a preselected concentration, the alkali metal ion concentration detector sets the third diverter valve to connect the inlet thereof to the second outlet thereof. In one embodiment, this detector measures the conductivity of the liquid that the second diverter valve's second outlet provides.

In regeneration mode, during a first slow rinse phase, the system uses modified diverter valves to direct the effluent during this phase through a nanofilter to the brine tank. During a later fast rinse phase, at least a portion of the water in the softener tank that has dissolved salt may also be directed to the brine tank.

The system is also compatible with a further improvement that, while the softener is in normal mode, allows the nanofilter to process the contents of the buffer tank, removing and discharging any remaining hardness ions in the buffer tank.

BRIEF DESCRIPTION OF THE DRAWING

The FIGURE is a diagram of a water softener system including water treatment by a nanofilter allowing reuse of the softener salt.

DETAILED DESCRIPTION OF THE INVENTION

Referring to the FIGURE, a water softening system 10 according to the invention conventionally includes a connection to a source 20 of hard water to be softened such as a municipal water main or a well. During a normal operating mode or cycle, water from source 20 is directed to an input connection of a softener tank 19. Tank 19 contains resin particles on which hardness ions in the water adsorb to soften the water as it flows through tank 19. The softened water from tank 19 is then supplied to a user such as a building through a plumbing connector 40.

Also conventionally, system 10 operates in addition to the normal mode, in a regeneration mode. The regeneration mode has a first slow rinse phase during which bivalent hardness ions adsorbed onto the resin particles are replaced by monovalent salt ions by flow of regenerant from a brine tank 43. A fast rinse phase follows the slow rinse phase, during which salt remaining in the liquid within softening tank 19 is flushed from tank 19.

Operation of system 10 is controlled in part by a controller 14 which selects the settings of first through third diverter valves 17, 35, and 45. Controller 14 receives a regeneration signal on a path 15. The signal may be generated by nothing more than a clock sequencer or may comprise internal signals of a microprocessor that serves as controller 14.

Each of these diverter valves 17, 35, and 45 operates in a similar way. A control signal supplied by controller 14 on a group of paths 16 sets the operating state for each of the diverter valves 17, 35, and 45 dependent on the desired operating mode of system 10. These operating modes of system 10 are normal, slow rinse regeneration, and fast rinse regeneration.

In a first diverter valve state, an "a" or first internal path of the diverter valve is open and a "b" or second internal path is closed. In the first state, liquid flows through the "a' path only. In a second diverter valve state, liquid flows through the "b" path and the "a'" path is closed.

Controller 14 also manages the operation of a pump 51. A control signal on a path 22 causes pump 51 to operate as controller 14 specifies during the regeneration.

Diverter valve 45 may also be controlled by an optional conductivity test element 78 receiving a conductivity signal from a conductivity sensor 70, also optional. In all other respects, operation of diverter valve 45 is identical to that of diverter valves 17 and 35.

First and second diverter valves 17 and 35 control the operating mode in a conventional softening system. First diverter valve 17 has first and second inputs to "a" and "b" paths, from source 20 and brine tank 43 respectively. Valve 17 selectively directs the liquid from the selected input to an output 21 as specified by controller 14.

Second diverter valve 35 receives liquid from softener tank 19 in pipe 27 at the input, and selectively directs this liquid along "a" and "b" paths to first and second outputs respectively as specified by a schematically shown controller 14. In a conventional system, the "b" or second output of valve 35 flows to a drain. In both a conventional system and in system 10, water flows from the "a" or first output of valve 35 to users through connection 40. In conventional systems, valves 17 and 35 are typically combined in a single physical unit with functionality as shown.

During normal mode, diverter valve 17 causes liquid to flow only from source 20 to softener tank 19 and diverter valve 35 allows water to flow only from softener tank 19 to connection 40. Thus, in normal operating mode, water flows from source 20 to softener tank 19 and from there to connection 40 for distribution to the building.

In response to a regeneration signal on path 15, controller 14 starts the regeneration mode by closing the "a" paths and opening the "b" paths of valves 17 and 35, thereby shutting off water flow from source 20 to softener tank 19 and to plumbing connection 40. For this reason, regeneration is preferably done when little or no water usage occurs such as during nighttime. The design of diverter valve 17 may also directly connect source 20 to connection 40 during regeneration, to provide unsoftened water to users during that time.

The improved softening system 10 shown in the FIGURE has modifications compared to current systems during the handling of liquid from softening tank 19 in regeneration mode. As mentioned, the regeneration mode has a slow rinse phase, followed by a fast rinse phase that clears residual salt from the softener tank 19. Controller 14 selects the normal and regeneration modes responsive to the regeneration signal on path 15 and during the regeneration mode, the two phases of the regeneration mode.

The description hereafter explains the improvements found in the regeneration mode of system 10. In system 10, diverter valve 35 directs the effluent from the regeneration cycle back to brine tank 43 through a buffer tank 53, a pump 51, and a nanofilter (NF) 25 rather than directly to a drain. Nanofilter 25 has a high pressure inlet to which pipe 23 from pump 51 attaches, a high pressure outlet to which pipe 32 attaches, and a low pressure outlet to which pipe 28 attaches.

The system 10 includes additional elements to efficiently reuse or reclaim a substantial percentage of the regeneration salts. Thus, system 10 provides for directing much of the liquid bearing salt ions flowing from the softening tank 19 during both the slow and fast rinse phases back to brine tank 43. The flow of liquid to brine tank 43 during the fast rinse phase may stop when of salinity of this liquid falls below a predetermined level or when tank 43 is full.

The structure of third diverter valve 45 is functionally very similar to that of second diverter valve 35. The second, "b" path of second diverter valve 35 connects to the inlet of third diverter valve 45. The first or "a" path in third diverter valve 45 connects to buffer tank 53. The second, "b" path of third diverter valve 45 connects directly to the drain.

During the slow rinse phase, the "b" path of both first and second diverter valves 17 and 35 is open and the "a" path of valve 45 is open. Regenerant from tank 43 flows through softener tank 19 picking up divalent hardness ions such as calcium adsorbed on the resin particles. Liquid comprising this regenerant/hardness ions solution then flows from the softener tank 19 through the "b" path of valve 35 to the inlet of valve 45.

During the slow rinse phase, controller 14 holds the "a" path of diverter valve 45 open allowing liquid carrying the hardness ions and regenerating salt to flow from valve 35 through pipe 48 to buffer tank 53. The liquid then flows to pump 51 via pipe 49 and the inlet of nanofilter 25 via pipe 23.

During the slow rinse phase, controller 14 activates pump 51, which supplies pressurized liquid from buffer tank 53 through pipe 23 to nanofilter 25 having an element 25a. Pump 51 increases the pressure of the regenerant with the dissolved hardness ions to perhaps 100-150 psig. A throttling valve 31 connects the upstream side of nanofilter 25 to a drain.

Element 25a typically comprises a spirally wound membrane that blocks a substantial percentage of the hardness ions and allows a high percentage of the salt ions to pass through the membrane. The NF membrane element 25a has an upstream or high pressure side (indicated as NFH) and a downstream, low pressure side (indicated as NFL) that is at essentially atmospheric pressure. The NFH side has an inlet to which pipe 25 connects and an outlet connecting to pipe 32 carrying a liquid with a high concentration of hardness ions.

The liquid on the downstream side of nanofilter 25 comprises a liquid permeate stream provided to a pipe 28. The liquid permeate stream has a reduced concentration of the hardness ions, and a relatively high concentration of sodium or potassium ions.

The permeate stream returns to brine tank 43 through pipe 28, a check valve 56, and a pipe 29. The absence of the hardness ions in the permeate stream in pipe 28 results from the flow of the regenerant through the NF membrane element 25a. Check valve 56 may be integral with nanofilter 25.

Buffer tank 53 may be unnecessary in some systems. In some types of softener systems whose flow of regenerant through softener tank 19 during slow rinse is greater than the capacity of nanofilter 25, buffer tank 53 may be interposed between valve 45 and pump 51 to allow a suitable flow rate of regenerant through softening tank 19. Over a period of time, pump 51 then draws down any excess liquid in tank 53.

The liquid that does not pass through the NF membrane element 25a has a high concentration of hardness ions (relative to the NFL side of element 25a). This concentrate stream thus contains most of the hardness ions in the liquid flowing in pipe 23 and possibly a small amount of regenerant. Liquid not passing through nanofilter 25 flows through a pipe 32 to throttling valve 31 and from valve 31, to the drain. Throttling valve 31 and membrane 25a cooperate to divide flow between membrane element 25a and throttling valve 31. Valve 31 may comprise an orifice or other pressure-dropping device.

The high pressure at the NFH side of membrane 25a forces a major portion of the pumped liquid through membrane element 25a. The pressure drop across both membrane element 25a and throttling valve 31 are each approximately equal to each other and to the pump 51 pressure, assuming the brine tank 43 is maintained at approximately atmospheric pressure.

In one preferred embodiment, throttling valve 31 comprises a flow restrictor such as an orifice whose pressure drop relative to element 25a divides the liquid flow from pipe 23 so that approximately 75-95% of this liquid flows through element 25a to brine tank 43 and approximately 5-25% flows through throttling valve 31 to the drain. 90% of the flow in pipe 23 reaching pipe 28 is one current preferred value.

Almost all of the bivalent hardness ions in the liquid supplied by pipe 23 are contained in the liquid flowing through the high pressure outlet of nanofilter 25 to pipe 32. The salt concentration in the liquid carried by both pipes 28 and 32 is nearly equal. However, most of the liquid flowing in pipe 23 passes through membrane 25a and returns to brine tank 43, thereby substantially reducing both the volume of drain water and the total mass of salt entering the drain. Since the flow of liquid through throttling valve 31 is substantially less than that through nanofilter 25, most of the salt ions in the flow through pipe 23 thus return to brine tank 43. Directing most of the flow through pipe 23 to flow through nanofilter 25 to brine tank 43 dramatically reduces the total amount of salt flowing to the drain.

Preferably, the membrane element 25a has a spiral-wound configuration, although other configurations are possible, such as capillary fiber, tubular, or plate and frame. A common configuration for such a membrane 25a comprises many turns of a strip of membrane material with the edges sealed in some manner to cause a great majority of the liquid entering the NFH side to either pass through the membrane 25a pores or flow to valve 31.

The following examples, without limitation, are types of NF membrane elements 25a that are acceptable for use in the present invention, although their manufacturers may or may not have their products evaluated for this application: a spiral wound NF-270 membrane made by Dow Filmtec; a spiral-wound XN45 membrane made by TriSep Corp.; a spiral-wound SR2 membrane, by Koch Membrane Systems; a spiral-wound NF membrane using a special polymer, by Hydranautics; and a spiral-wound NF membrane using a special polymer, by GE Osmonics.

Generally, a suitable NF membrane element 25 has a minimum of approximately 90% multivalent salts rejection and a maximum of approximately 20% monovalent salts rejection. If the concentration of the regenerant in tank 43 is maintained above approximately 10% alkali salts, pH adjustment is usually unnecessary. NF membrane element 25 can remove hardness ions from unmodified regenerant in buffer tank 53. The term "unmodified" in this context refers to regenerant that has not been subjected to pH adjustment or other chemical treatment before passing to NF membrane element 25.

In conventional systems during the fast rinse phase, controller 14 closes the "b" path of valve 17 and opens the "a" path for a period of time. Valve 35 remains with the "a" path closed and the "b" path open. This allows water from source 20 to flush salts-containing liquid from softener tank 19. In a conventional system, this salt-containing liquid flows directly to the drain. Eventually controller 14 sets both valves 17 and 35 to activate their "a" paths, ending the regeneration mode.

Pipe 32 also connects to a throttling valve 61 which then connects to an input of buffer tank 53. The flow rate along the high-pressure side of NF membrane element 25a from the inlet to the high pressure outlet at pipe 32 should be high enough to maintain sufficient turbulence adjacent the membrane 25a surface to limit fouling. This may be accomplished by directing a portion of the liquid leaving the high pressure outlet of nanofilter 25 through line 32 to throttling valve 61 and back into tank 53.

The system 10 may also include a further improvement relating to the fast rinse phase. Liquid flowing through path "a" of diverter valve 45 during the fast rinse phase first flows through a conductivity sensor 70. Sensor 70 provides a conductivity signal to a conductivity tester 78. The conductivity signal indicates the conductance of the liquid flowing through sensor 70, which indicates the concentration of salts or alkali metal ion concentration (salinity) in this liquid. When the conductivity signal indicates a salts concentration below a preselected level, tester 78 supplies a signal on path 81 to diverter valve 45 overriding the signal on path 16 to close path "a" and open path "b". The fast rinse liquid carried by pipe 41 at this point in the fast rinse cycle contains a sufficiently low salts concentration that directing fast rinse liquid to the drain is harmless.

During at least the first part of the fast rinse phase of regeneration however, tester 78 may detect salts concentration in the flow through sensor 70 to be above the preselected The open "a" path of valve 45 directs this relatively concentrated regenerant back to the tank 43 through pump 51 and nanofilter 25. Of course, the amount of liquid flowing to tank 53 must not cause either buffer tank 53 or brine tank 43 to overflow, so the level at which tester 78 changes the setting of diverter valve 45 must be properly selected.

To summarize, this improvement serves two purposes. First of all, some salts rinsed from softener tank 19 during the fast rinse cycle return to brine tank 43, further reducing the amount of salt sent to the drain. Secondly, the water lost to the drain during regeneration is replaced by previously used water, so the overall regeneration process uses less water.

The FIGURE shows further improvements related to monitoring the functionality of nanofilter 25. A pressure sensor 64 is connected between the nanofilter inlet 23 and nanofilter low pressure outlet 28 and provides a pressure difference signal to a pressure test element 67 encoding the pressure difference sensed by sensor 64.

If the sensed pressure difference is outside of a preselected range the test element 67 provides a fault signal of some kind, such as an appropriate indicator light. In this way both clogging and perforation of nanofilter 25 will be detected. The range will be determined by pump and nanofilter 25 characteristics.

The FIGURE shows another pressure sensor 84 monitoring the functionality of nanofilter 25. Pressure sensor 84 is connected between the nanofilter inlet 23 and the nanofilter high pressure outlet 32 and provides a pressure difference signal to a pressure test element 87 encoding the pressure difference sensed by sensor 84. Sensor 70 and tester 78 together comprise a salinity detector.

If the sensed pressure difference is outside of a preselected range the test element 87 provides a fault signal of some kind, such as an appropriate indicator light. Recall that nanofilter 25 is configured as a spirally wound filter element. It is possible that after extended usage, the passage within filter element 25a from pipe 23 to pipe 32 will partially clog. The pressure drop between pipes 23 and 32 will increase due to this clogging. By detecting this increased pressure drop, the clogging of nanofilter 25 will be detected. The appropriate pressure drop to indicate clogging will be determined by pump and nanofilter 25 characteristics.

Although the preferred embodiments of the NF water treatment system for water softeners have been described herein, it should be recognized that numerous changes and variations can be made to these embodiments, which changes and variations are still within the scope and spirit of the present invention. The present invention should not be unduly limited by the illustrative embodiments and examples set forth herein for exemplary purposes. Rather, the scope of the present invention is to be defined by the claims.

What is claimed is:

1. Apparatus for regenerating a water softening system said system of the type that removes multivalent ions from water provided by a hard water source, and recovers at least a portion of the regenerating salts used for the regeneration, the water softening system including:
   a) a softener tank through which the water from the hard water source passes from an upstream end thereof to a downstream end thereof;
   b) a brine tank for holding a regenerating solution;
   c) a first diverter valve supplying liquid selectively from either the hard water source or the brine tank to the upstream end of the softener tank;
   d) a nanofilter having upstream and downstream sides, said upstream side having an inlet and an outlet, and said downstream side having an outlet, said nanofilter passing monovalent ions to the downstream side and retaining multivalent ions on the upstream side;

e) a second diverter valve having an inlet connected to receive liquid from the downstream end of the softener tank and to selectively supply liquid at a first outlet to a water distribution system and to a second outlet;

f) a connection between the downstream side outlet of the nanofilter and the brine tank;

g) a throttling valve connected between the upstream side outlet of the nanofilter and a drain;

h) a pump receiving liquid from the second outlet of the second diverter valve and supplying pressurized liquid to the upstream side inlet of the nanofilter;

i) a third diverter valve having an inlet and first and second selectable outlets, said inlet thereof connected to receive liquid from the second outlet of the second diverter valve, said first outlet of the third diverter valve connected to the pump, and said second outlet of the third diverter valve connected to the drain; and j) a controller that in response to a regeneration signal, operates the first diverter valve to pass solution from the brine tank through the softener tank of the water softening system, operates the second diverter valve to direct liquid from the downstream end of the softener tank to the second output of the second diverter valve, and operates the third diverter valve during a first phase of a regeneration cycle to supply liquid from the second outlet of the second diverter valve to the first outlet of the third diverter valve and during a second phase of the regeneration cycle which follows the first phase of the regeneration cycle, operating the third diverter valve to direct liquid from the second diverter valve to the second outlet of the third diverter valve.

2. The apparatus of claim 1, further including a buffer tank interposed between the third diverter valve's first outlet and the pump, and wherein the controller includes means for operating the second and third diverter valves to direct liquid from the downstream end of the softener tank to the buffer tank during the regeneration cycle.

3. The apparatus of claim 1 wherein the throttling valve has a pressure drop that causes from 5-25% of the flow to the nanofilter's upstream side inlet to divert to the upstream outlet and to the drain.

4. The apparatus of claim 1, wherein the water softening system further comprises a pipe between the third diverter valve's second outlet and the drain.

5. The apparatus of claim 4, and further including an alkali metal ion concentration detector receiving liquid from the second diverter valve's second outlet and sensing the alkali metal ion concentration of said liquid, and responsive to the alkali metal ion concentration of said liquid below a preselected concentration, setting the third diverter valve to connect the inlet thereof to the second outlet thereof.

6. The apparatus of claim 5, wherein the alkali metal ion concentration detector comprises a conductivity sensor.

7. The apparatus of claim 1, and further including a detector receiving liquid from the second diverter valve's second outlet and sensing the salinity of said liquid, and responsive to the salinity of said liquid below a preselected concentration, setting the third diverter valve to connect the inlet thereof to the second outlet thereof.

8. The apparatus of claim 7, wherein the detector comprises a conductivity sensor.

* * * * *